US012496603B1

(12) United States Patent
Xie

(10) Patent No.: US 12,496,603 B1
(45) Date of Patent: Dec. 16, 2025

(54) WATER GUN

(71) Applicant: Mjjc Manufacturing Co., Ltd., Guangzhou (CN)

(72) Inventor: Xiangcheng Xie, Yongzhou (CN)

(73) Assignee: Mjjc Manufacturing Co., Ltd., Guangzhou (CN)

( * ) Notice: Subject to any disclaimer, the term of this patent is extended or adjusted under 35 U.S.C. 154(b) by 0 days.

(21) Appl. No.: 19/227,567

(22) Filed: Jun. 4, 2025

(30) Foreign Application Priority Data

Dec. 31, 2024 (CN) ........................ 202411999615.X
Dec. 31, 2024 (CN) ........................ 202423322928.X

(51) Int. Cl.
*B05B 9/01* (2006.01)
*B05B 12/00* (2018.01)

(52) U.S. Cl.
CPC .............. *B05B 12/002* (2013.01); *B05B 9/01* (2013.01)

(58) Field of Classification Search
CPC ....... B05B 9/01; B05B 12/002; B05B 12/004; B08B 3/028
See application file for complete search history.

(56) References Cited

U.S. PATENT DOCUMENTS 3,054,210 A * 9/1962 Kratzer .................. B65D 83/60 239/654
2009/0308892 A1 * 12/2009 Clark .................. B05B 12/0026 222/1

* cited by examiner

*Primary Examiner* — Tuongminh N Pham
(74) *Attorney, Agent, or Firm* — Jose Cherson Weissbrot

(57) ABSTRACT

The present application relates to a water gun. A trigger of the water gun is provided with a self-locking zone in which a self-locking structure is disposed, a first end of an effort-saving hook assembly being located in the self-locking zone. When the trigger is pulled, the first end of the effort-saving hook assembly is movable within the self-locking zone, when the trigger is released, the first end of the effort-saving hook assembly is locked with the self-locking structure to achieve self-locking of the trigger, and when the trigger is pulled and released again, the first end of the effort-saving hook assembly is unlocked from the self-locking structure.

9 Claims, 8 Drawing Sheets

WATER GUN

TECHNICAL FIELD

The present application relates to the technical field of water guns, and in particular to a water gun.

BACKGROUND

With the improvement of living standards, a household high-pressure washer, as a very effective cleaning tool, has been popular with the majority of families. As a main component of the high-pressure washer, a water gun is a machine that uses a power device to enable a high-pressure plunger pump to generate high-pressure water for washing a surface of an object, and can remove and wash away dirt to achieve the purpose of cleaning the surface of the object.

SUMMARY

A water gun, including:

- a housing;
- an effort-saving hook assembly disposed in the housing and rotatable relative to the housing; and
- a trigger partially exposed from the housing and movable relative to the housing, the trigger being provided with a self-locking zone in which a self-locking structure is disposed;
- where the effort-saving hook assembly includes a first end, the first end of the effort-saving hook assembly being located in the self-locking zone, when the trigger is pulled, the first end of the effort-saving hook assembly is moved within the self-locking zone, when the trigger is released, the first end of the effort-saving hook assembly is locked with the self-locking structure to achieve self-locking of the trigger, and when the trigger is pulled and released again, the first end of the effort-saving hook assembly is unlocked from the self-locking structure.

BRIEF DESCRIPTION OF THE DRAWINGS

In order to more clearly describe the technical solutions in the embodiments of the present application or the prior art, the drawings necessary for describing the embodiments or the prior art will be briefly described below. Apparently, the drawings in the description below merely show some of the embodiments of the present application, and those of ordinary skill in the art would have obtained other drawings from these drawings without involving any inventive effort.

LIST OF REFERENCE SIGNS

Figure 1:
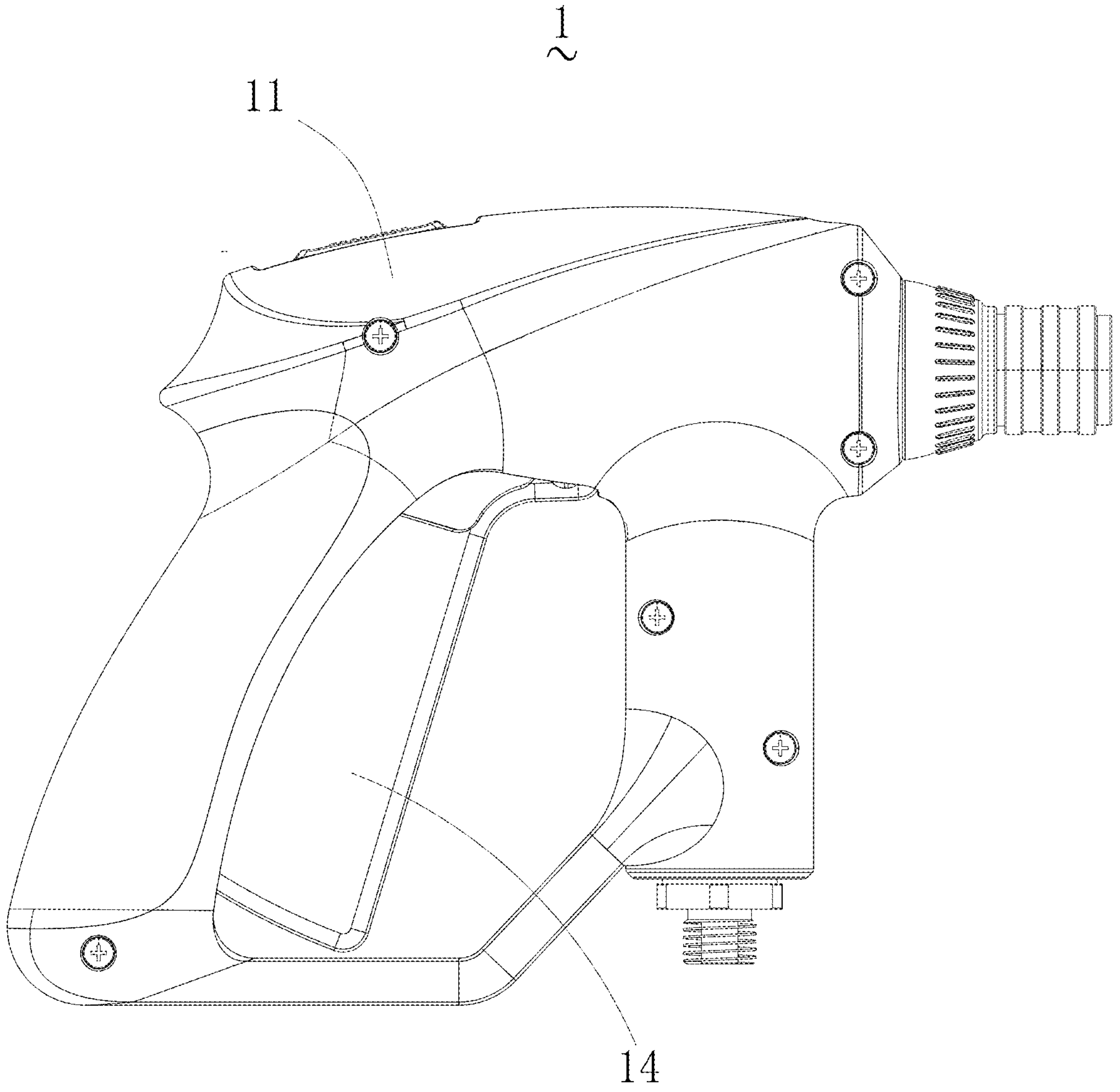
FIG. 1 is a structural schematic perspective view of a water gun according to an embodiment of the present application.

1. Water gun; 11. Housing; 12. Gear assembly; 13. Effort-saving hook assembly; 133. First end; 131. Second end; 14. Trigger; 15. Water intake pipe; 16. Water output pipe; 17. Valve; 18. Pressure spring; 19. Self-locking structure; 121. Sliding member; 122. Slider; 123. Slide rail; 131. Abutment post; 132. Rotating shaft; 133. Movable hook; 134. Tension spring; 141. Recess; 142. Limiting zone; 143. Movement zone; 144. Self-locking zone; 1231. Movement slot; 1441. Arc-shaped bayonet; 1442. Step; 1443. Auxiliary ramp.

DETAILED DESCRIPTION OF EMBODIMENTS

For ease of understanding of the present application, a more complete description of the present application will be made with reference to relevant drawings. Embodiments of the present application are illustrated in the accompanying drawings. However, the present application may be implemented in many different forms and is not limited to the embodiments described herein. On the contrary, these embodiments are intended to make the disclosure of the present application more thorough and comprehensive.

Unless otherwise defined, all technical and scientific terms used herein shall have the same meanings as commonly understood by those skilled in the art to which the present application relates. The terms used herein in the specification of the present application are only used to describe specific embodiments, and are not intended to limit the present application.

It should be understood that the terms such as "first", "second" and "third" used in the present application may be intended to describe various elements herein, but these elements are not limited by these terms. These terms are used only to distinguish a first element from another element. When used herein, the singular forms of "a", "an" and "the/this" may also include plural forms, unless clearly indicated otherwise in the context. It should also be understood that the terms such as "include/comprise" and "have" specify the presence of mentioned features, units, steps, operations, components, portions, or combinations thereof, but do not exclude the presence or addition of one or more other features, units, steps, operations, components, portions, or combinations thereof.

It should be noted that when an element is referred to as being "fixed to" another element, the element may be directly located on the other element or an intermediate element may exist. When one element is considered to be "connected" to another element, the element may be directly connected to another element or an intermediate element may also be present. The terms "vertical", "horizontal", "left", "right" and similar expressions used herein are for the purpose of illustration only.

In the present application, orientations or position relationships indicated by terms such as "upper", "lower", "left", "right", "front", "rear", "top", "bottom", "inner", "outer", "middle", "vertical", "horizontal", "transverse" and "longitudinal" are based on orientations or position relationships shown in the accompanying drawings. These terms are mainly intended to better describe the present application and the embodiments thereof and are not intended to limit that a mentioned device, element or constituent part must have a specific orientation, or be constructed and operated in a specific orientation. Moreover, some of the above terms may be used to denote other meanings apart from the orientations or positional relationships. For example, the term "upper" may also be used to denote a certain attachment relationship or connection relationship in some circumstances. For those skilled in the art, the specific meanings of the terms mentioned above in the present application may be construed according to specific circumstances.

In addition, the terms "mount", "arrange", "provide", "connect" and "couple" should be understood in a broad sense. For example, it may be a fixed connection, a detachable connection, or an integral construction, may be a mechanical connection, or an electrical connection, or may be a direct connection, an indirect connection by means of an intermediate medium, or internal communication between two means, elements or constituent parts. The specific meanings of the above terms in the present application may be understood by those skilled in the art according to specific situations.

In the embodiments of the present application, it is defined that, when a water gun is used by a user, an upward end of the water gun is an upper end, and a downward end of the water gun is a lower end.

Figure 2:
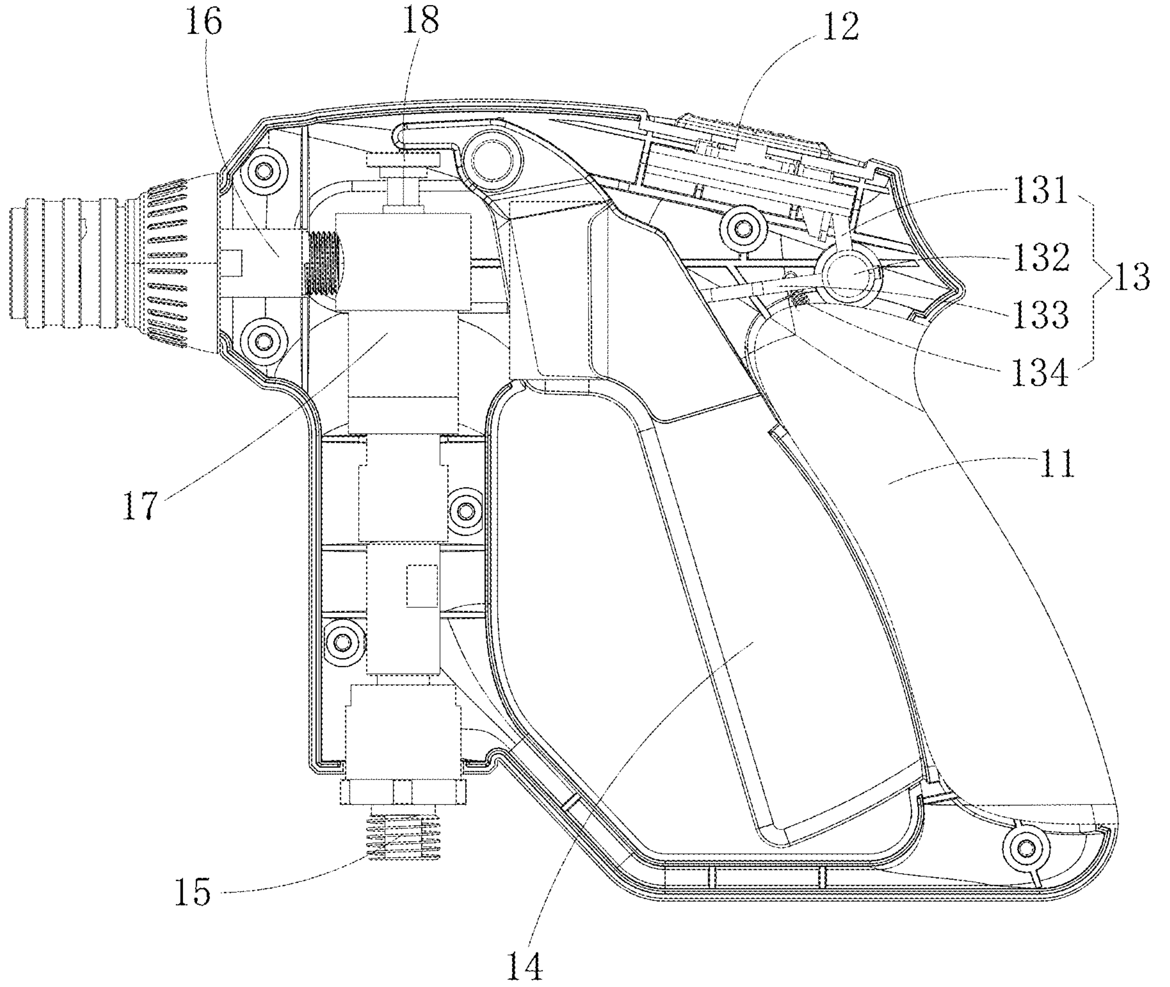
FIG. 2 is a first partial structural schematic perspective view of a water gun according to an embodiment of the present application.
Figure 3:
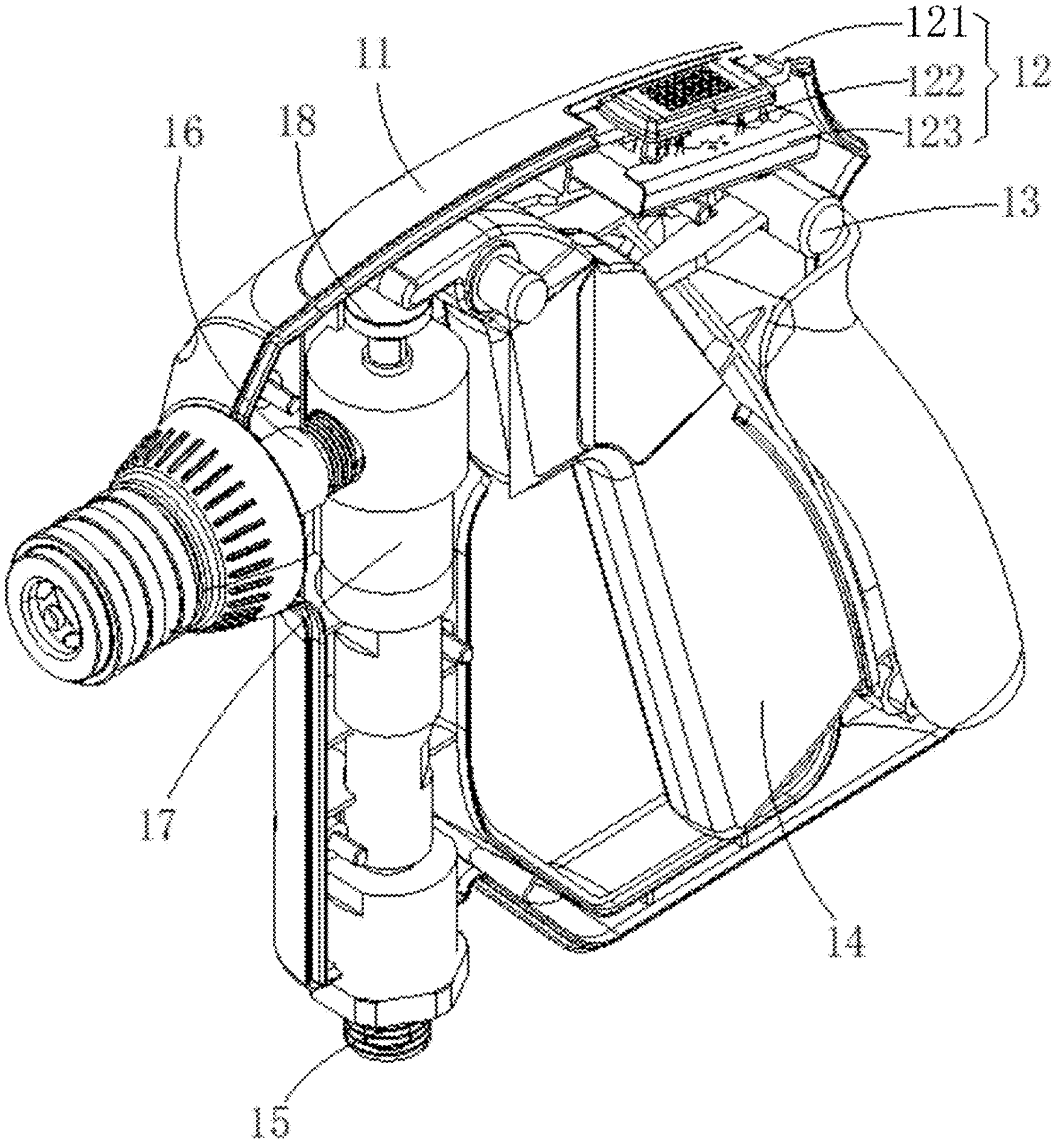
FIG. 3 is a second partial structural schematic perspective view of a water gun according to an embodiment of the present application.

Referring to FIGS. 1-3, the embodiments of the present application provide a water gun 1. The water gun 1 includes a housing 11, a gear assembly 12, an effort-saving hook assembly 13 and a trigger 14. The effort-saving hook assembly 13 is disposed in the housing 11 and rotatable relative to the housing 11. The gear assembly 12 is partially exposed from the housing 11 and movable relative to the housing 11. One end of the trigger 14 is rotatably connected to the housing 11, and the other end of the trigger 14 is exposed from the housing 11 and movable relative to the housing 11. The gear assembly 12 is switchable between a first state, a second state and a third state under the action of an external force.

Still referring to FIGS. 2 and 3, the water gun 1 further includes a water intake pipe 15, a water output pipe 16, a valve 17 and a pressure spring 18, both the water intake pipe 15 and the water output pipe 16 being mounted in the housing 11. One end of the water output pipe 16 is connected to one side of the valve 17, an upper end of the water intake pipe 15 is connected to a lower end of the valve 17, a lower side of one end of the trigger 14 abuts against one end of the pressure spring 18, and the other end of the pressure spring 18 is connected to an upper end of the valve 17. When the trigger 14 is pulled, the pressure spring 18 is pressed, and the valve 17 is driven to allow communication between the water intake pipe 15 and the water output pipe 16; and when the trigger 14 is released, the pressure spring 18 recovers from deformation, and the valve 17 is driven to close the water intake pipe 15 and the water output pipe 16.

In an embodiment, by means of the cooperation between the trigger 14, the pressure spring 18 and the valve 17, the valve 17 is easily opened by pressing the trigger 14 to communicate the water intake pipe 15 with the water output pipe 16, thereby reducing the burden of a user's hand. Furthermore, when the trigger 14 is released by the user, the pressure spring 18 recovers from deformation, such that the trigger 14 returns to a normal state to close the water intake pipe 15 and the water output pipe 16.

It should be noted that the control of the valve 17 over the communication or closing of the water intake pipe 15 and the water output pipe 16 is known in the prior art, which is not described in detail in the embodiments of the present application.

Figure 4:
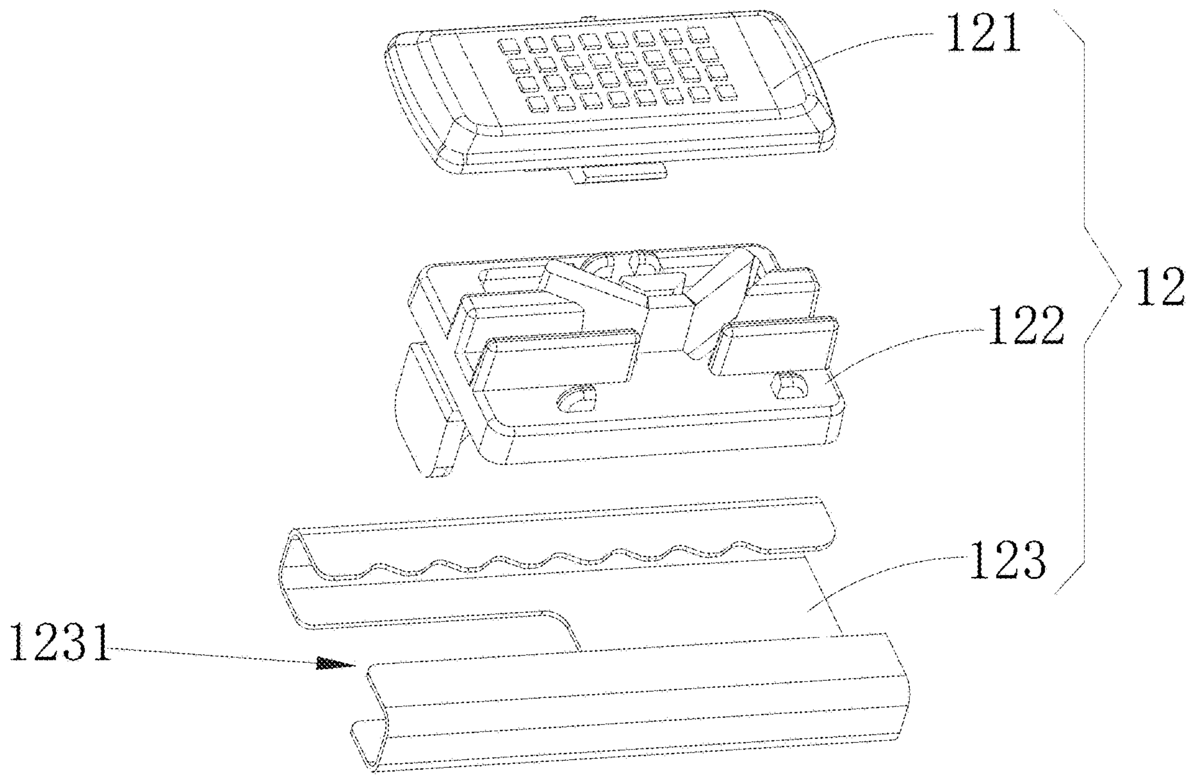
FIG. 4 is an exploded structural schematic view of a gear assembly of a water gun according to an embodiment of the present application.

Referring to FIGS. 3 and 4, specifically, the gear assembly 12 includes a sliding member 121, a slider 122 and a slide rail 123. The slide rail 123 is fixed in the housing 11, the slider 122 is slidably connected to the slide rail 123, the sliding member 121 is engaged with the slider 122 and exposed from the housing 11, and the slider 122 can be moved by means of a user operating the sliding member 121. A movement slot 1231 is provided in the slide rail 123, and the effort-saving hook assembly 13 includes a first end 133 and a second end 131, where the second end 131 of the effort-saving hook assembly 13 is located in the movement slot 1231, and under the action of an external force, the sliding member 121 can drive the slider 122 to get close to or away from the second end 131 of the effort-saving hook assembly 13, thereby achieving the switching between the first state, the second state and the third state.

It should be understood that in the first state, a movement clearance is provided between the second end 131 of the effort-saving hook assembly 13 and the slider 122, and the second end 131 of the effort-saving hook assembly 13 is movable in the movement slot 1231. In the second state and the third state, the second end 131 of the effort-saving hook assembly 13 abuts against the slider 122.

More specifically, an acting force between the effort-saving hook assembly 13 and the slider 122 in the third state is greater than an acting force between the effort-saving hook assembly 13 and the slider 122 in the second state.

In an embodiment, rapid switching between the first state, the second state and the third state is achieved by means of an easy cooperation between the sliding member 121, the slider 122 and the slide rail 123, which is simple to understand and easy to operate, can avoid a misoperation of the user, and also facilitates the assembly and disassembly of the water gun 1.

Figure 5:
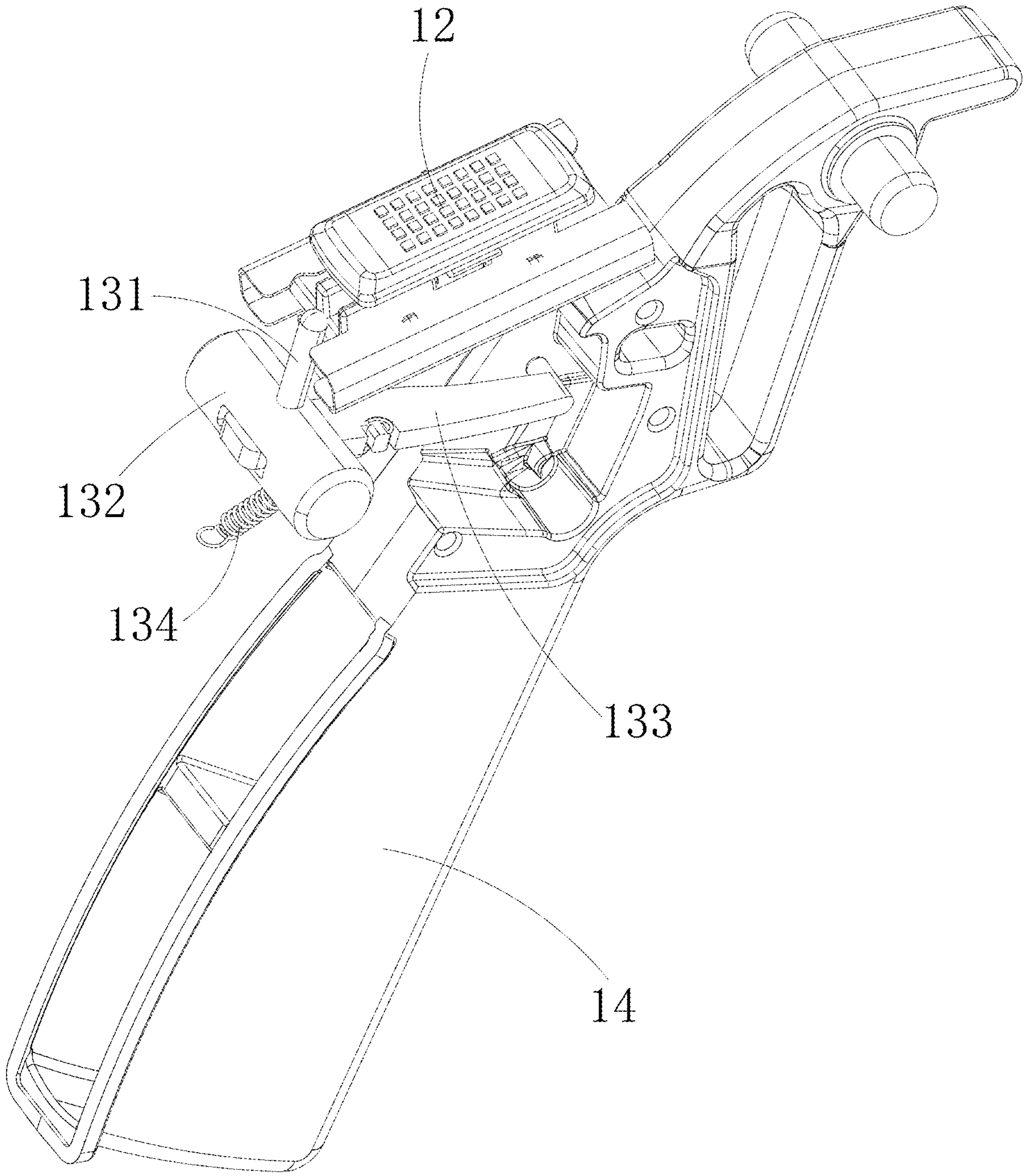
FIG. 5 is a third partial structural schematic perspective view of a water gun according to an embodiment of the present application.
Figure 6:
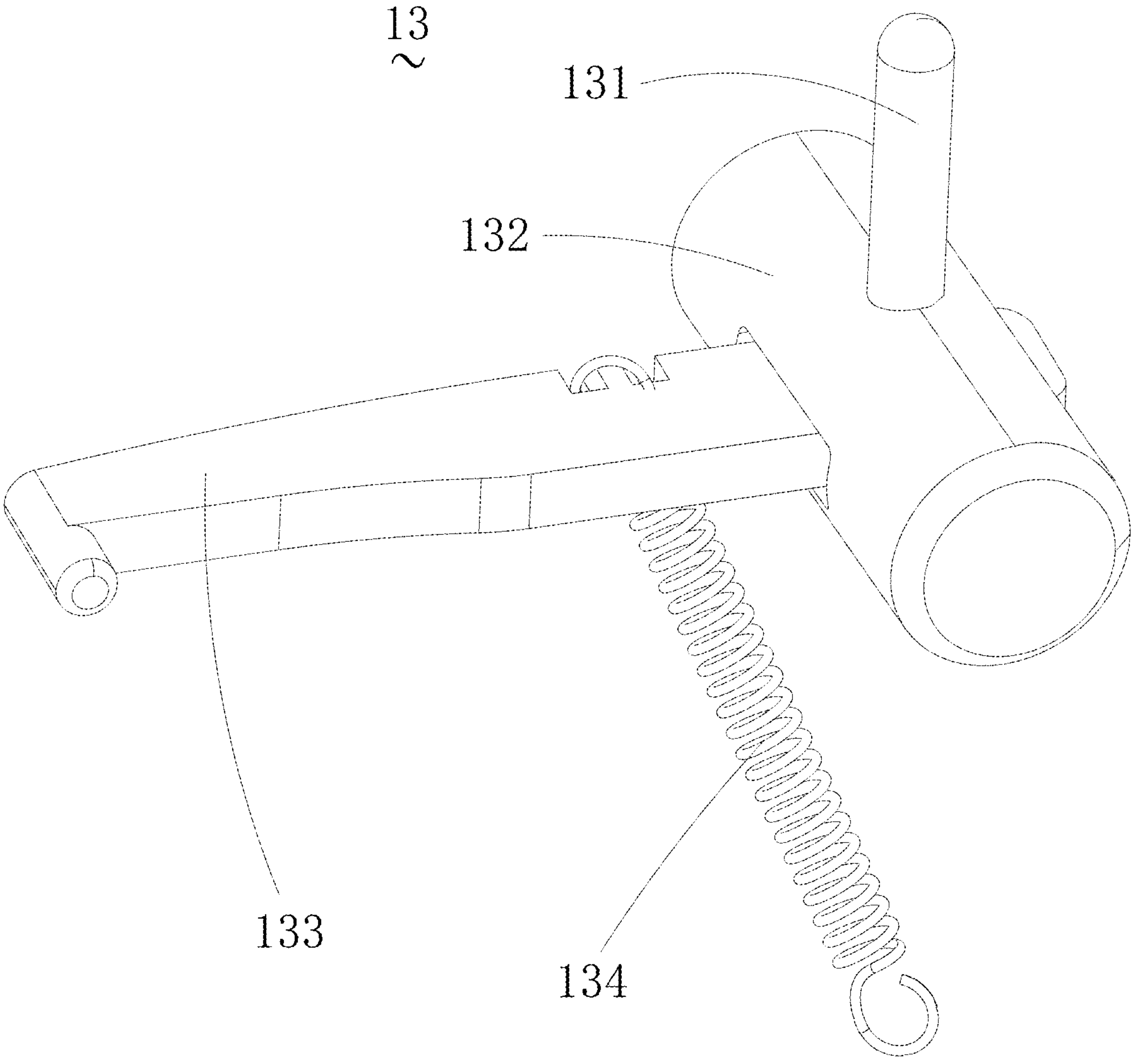
FIG. 6 is a structural schematic perspective view of an effort-saving hook assembly of a water gun according to an embodiment of the present application.

Referring to FIGS. 2, 5 and 6, specifically, the effort-saving hook assembly 13 includes an abutment post 131, a rotating shaft 132, a movable hook 133 and a tension spring 134. The first end 133 of the effort-saving hook assembly 13 is the movable hook 133, the second end 131 of the effort-saving hook assembly 13 is the abutment post 131, and two ends of the rotating shaft 132 are movably disposed on an inner wall of the housing 11 to allow the rotation of the rotating shaft 132 about a central axis. The abutment post 131 and the movable hook 133 are disposed on a side of the rotating shaft 132, one end of the tension spring 134 is connected to the movable hook 133, and the other end of the tension spring 134 is connected to the inner wall of the housing 11.

An included angle between the abutment post 131 and the movable hook 133 ranges from 30° to 90°. For example, the included angle is 30°, 45°, 90°, etc. By limiting the included angle between the abutment post 131 and the movable hook 133, a limited space inside the housing 11 of the water gun 1 can be utilized to the most extent, thereby increasing the occupancy rate of the space of the housing 11.

In an embodiment, under the action of the abutment post 131, the rotating shaft 132, the movable hook 133 and the tension spring 134, the cooperation between the trigger 14 and the gear assembly 12 that are not in the same plane is realized, thereby achieving a change in a water spray state of the water gun in the first state, the second state and the third state. In addition, the effort-saving hook assembly 13 has a simple structure, which is conducive to mass production and assembly and facilitates later maintenance.

Figure 7:
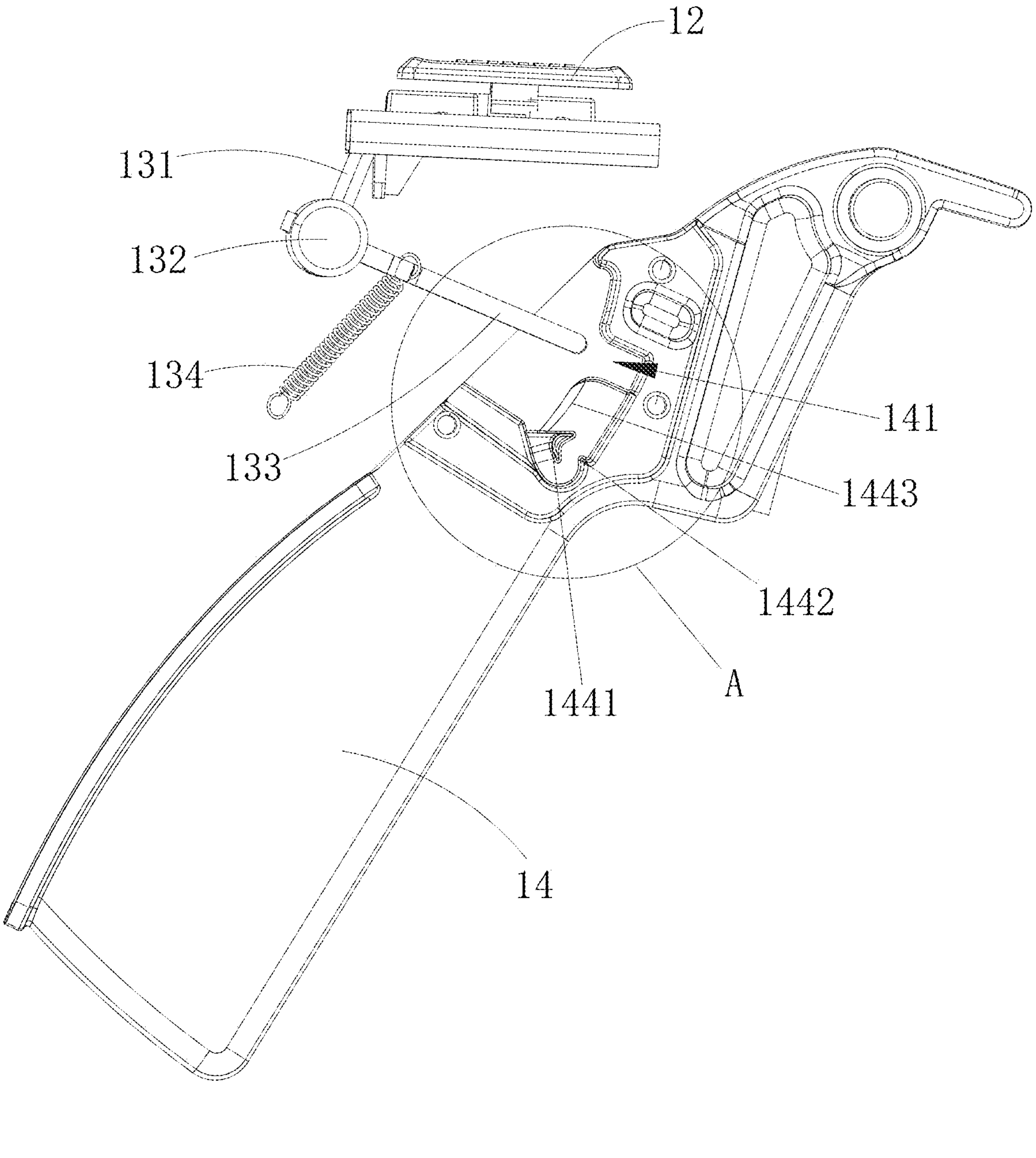
FIG. 7 is a fourth partial structural schematic perspective view of a water gun according to an embodiment of the present application.
Figure 8:
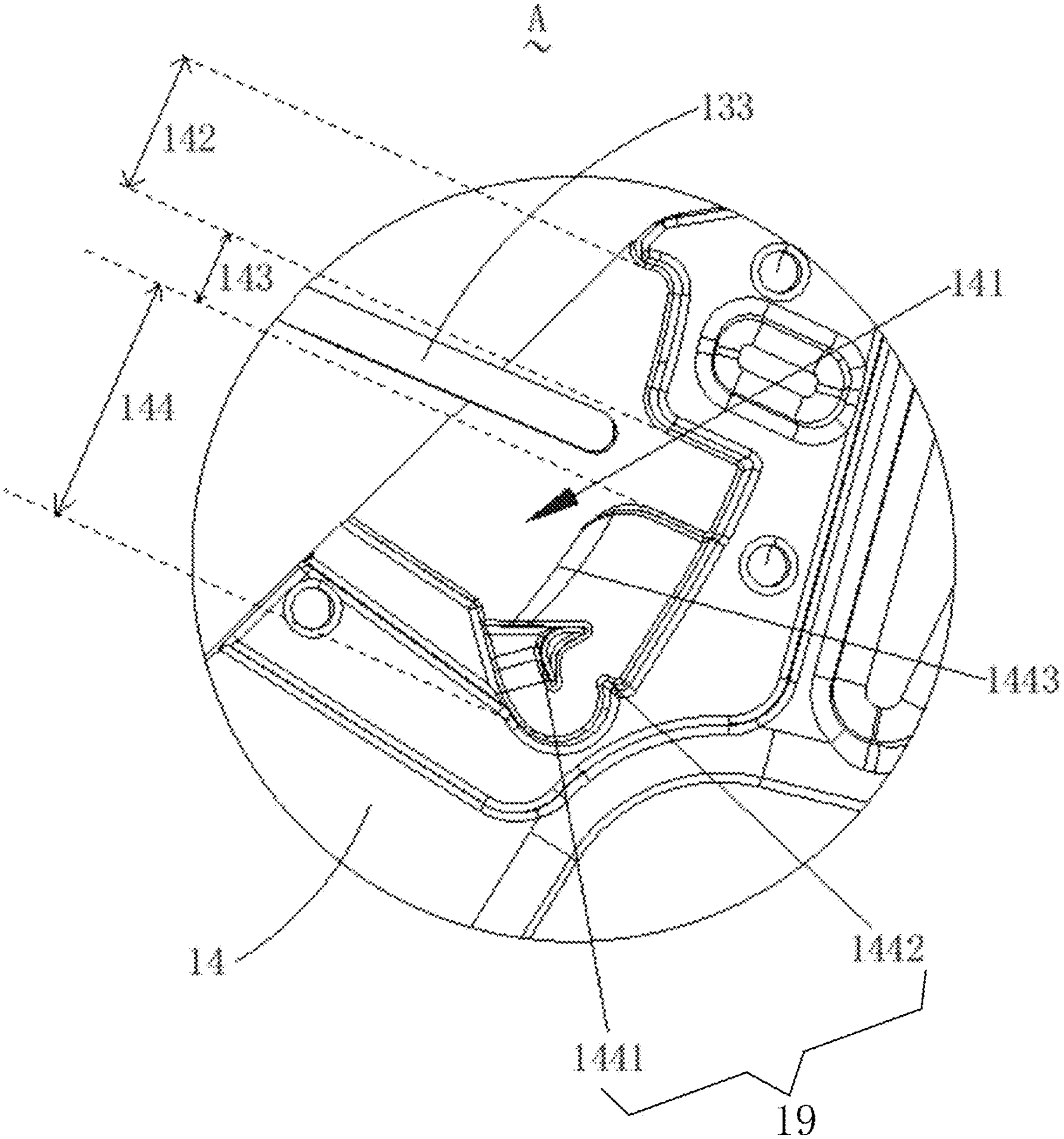
FIG. 8 is an enlarged schematic view of part A in FIG. 7.

Referring to FIGS. 7 and 8, specifically, a recess 141 is provided in the trigger 14, and the recess 141 is divided into a limiting zone 142, a movement zone 143 and a self-locking zone 144 from top to bottom (a direction from top to bottom refers to a direction from an end of the recess 141 close to the gear assembly 12 to an end of the recess 141 away from the gear assembly 12), where a self-locking structure 19 is provided in the self-locking zone.

It should be understood that since the abutment post 131 and the movable hook 133 are disposed on the side of the rotating shaft 132, the gear assembly 12 gradually gets close to the abutment post 131 in the first state, the second state and the third state, and in this case, the position of the movable hook 133 changes from bottom to top (a direction from bottom to top refers to a direction from an end of the recess 141 away from the gear assembly 12 to an end of the recess 141 close to the gear assembly 12). Therefore, by defining a sequence of the limiting zone 142, the movement zone 143 and the self-locking zone 144, it is possible to match the state change of the gear assembly 12, so as to adapt to the change in the water spray state of the water gun 1 in the three states.

More specifically, in the third state, the movable hook 133 abuts against an edge of the recess 141 in the limiting zone 142.

In an embodiment, a smooth corner transition is provided between the edge of the recess 141 in the limiting zone 142 and an edge of the recess 141 in the movement zone 143. With such a configuration, natural switching between the second state and the third state can be achieved, thereby avoiding jamming when the trigger 14 is pulled.

In an embodiment, by defining a distance between the edge of the recess 141 in the limiting zone 142 and the movable hook 133 and a distance between the edge of the recess 141 in the movement zone 143 and the movable hook, the switching between the second state and the third state is achieved without the cooperation with other components, resulting in a simpler overall structure of the water gun 1.

In an embodiment, the edge of the recess 141 in the limiting zone 142 is closer to the movable hook 133 than the edge of the recess 141 in the movement zone 143.

In an embodiment, a smooth transition is provided between an edge of the recess 141 in the self-locking zone 144 and the edge of the recess 141 in the movement zone 143. With such a configuration, the switching between the first state and the second state can be smoother.

Specifically, when the gear assembly 12 is switched to the first state, a movement clearance is provided between the second end 131 of the effort-saving hook assembly 13 and the gear assembly 12, the first end 133 of the effort-saving hook assembly 13 is located in the self-locking zone 144, and when the trigger 14 is pulled, the first end 133 of the effort-saving hook assembly 13 is movable within the self-locking zone 144 due to the presence of the movement clearance. When the trigger 14 is released, the first end 133 of the effort-saving hook assembly 13 is locked with the self-locking structure 19 to achieve self-locking of the trigger 14. When the trigger 14 is pulled and released again, the first end 133 of the effort-saving hook assembly 13 is unlocked from the self-locking structure 19. The problem of a conventional water gun being very laborious to use and even prone to causing injuries of the finger, being likely to cause hand fatigue of the user caused by long-time pressing on the trigger, and thus having poor user experience is solved. By means of the cooperation between the gear assembly 12 and the effort-saving hook assembly 13 and the trigger 14, the water gun 1 has a self-locking function, such that the hand fatigue of the user caused by long-time pressing on the trigger is avoided, and the user only needs to hold the water gun 1 without strongly pulling the trigger 14 to spray water, such that the purpose of saving effort is achieved.

Specifically, when the gear assembly 12 is switched to the second state, the second end 131 of the effort-saving hook assembly 13 abuts against the gear assembly 12, and the first end 133 of the effort-saving hook assembly 13 is caused to be located in the movement zone 143. When the trigger 14 is either pulled or released, the first end 133 of the effort-saving hook assembly 13 is freely movable within the movement zone 143. The functions in an effort-saving state and a conventional state can be freely switched by the user, and it enables water spraying when the trigger 14 is pressed and stops immediately when the trigger is released, such that water spraying in the conventional state can be selected by the user for short-time operation and use, thereby greatly improving the ease of use and practicability of the water gun 1, and improving the user experience.

Specifically, when the gear assembly 12 is switched to the third state, the second end 131 of the effort-saving hook assembly 13 abuts against the gear assembly 12, the first end 133 of the effort-saving hook assembly 13 is caused to be located in the limiting zone 142, and the first end 133 of the effort-saving hook assembly 13 abuts against the trigger 14 to fix the trigger 14 relative to the housing 11, which disables the trigger 14 to be pulled, and adds a further safety to the water gun 1, such that injuries caused by the user accidentally triggering the water gun 1 to spray water can be avoided, thereby improving the safety of the water gun 1.

It should be understood that the first state is the effort-saving state in which the water gun 1 is effortlessly used by the user. The second state is the conventional state in which the water gun 1 is used by the user in such a way that the water spraying is performed when the trigger 14 is pulled, and the water spraying is stopped when the trigger 14 is released. The third state is the locking state in which the trigger 14 cannot be pulled and the water gun 1 cannot spray water.

Still referring to FIGS. 7 and 8, specifically, the self-locking structure 19 includes an arc-shaped bayonet 1441 and a step 1442, the step 1442 being disposed corresponding to an opening of the arc-shaped bayonet 1441.

In the first state, a movement clearance is provided between the abutment post 131 and the gear assembly 12. When the trigger 14 is pulled, the movable hook 133 hooks the arc-shaped bayonet 1441 under the action of the tension spring 134 and the step 1442. When the trigger 14 is released, the movable hook 133 is locked with the arc-shaped bayonet 1441 to achieve the self-locking of the trigger 14. When the trigger 14 is pulled and released again, the movable hook 133 is disengaged from the arc-shaped bayonet 1441 under the action of the tension spring 134 and the step 1442 to achieve unlocking. The self-locking structure 19 is formed by the arc-shaped bayonet 1441 and the step 1442 to lock and release the trigger 14, achieving a simple structure, reduced manufacturing costs, and a reduced occurrence rate of failures, thereby improving the overall reliability of the water gun 1.

In an embodiment, the arc-shaped bayonet 1441 and the step 1442 are integrally formed on the trigger 14, to enable the water gun 1 to have better structural strength and durability.

In an embodiment, the arc-shaped bayonet 1441 is in a crescent shape, such that a smoother locking and releasing for the trigger 14 can be ensured, thereby reducing the jamming.

In an embodiment, the step 1442 is located on a center line of the arc-shaped bayonet 1441. With such a design, it can ensure that when the trigger 14 is pulled and released again, the trigger 14 is successfully released from self-locking.

In an embodiment, the step 1442 is a pointed triangular protrusion from the edge of the recess 141 in the self-locking zone 144. With such a pointed triangular configuration, the failure of self-locking of the trigger 14 caused by excessive pressing during the self-locking operation can be avoided, and a success rate of self-locking of the trigger 14 can be improved.

In an embodiment, an auxiliary ramp 1443 may be further disposed in the self-locking zone 144, and the auxiliary ramp is disposed close to the arc-shaped bayonet 1441. By providing the auxiliary ramp 1443, a height of the movable hook 133 can be increased, and the movable hook 133 is guided into the arc-shaped bayonet 1441 for locking, thereby increasing the accuracy of self-locking of the trigger 14.

For ease of understanding, the operation process of the water gun 1 is described in the embodiments of the present application and should not be construed as limiting.

When the water gun 1 is used, if the user needs to operate for a long time, the sliding member 121 can be moved to the first state, i.e., the effort-saving state, and at this point, a movement clearance is provided between the abutment post 131 and the slider 122, the abutment post 131 is movable in the movement slot 1231, and the movable hook 133 is located in the self-locking zone 144. When the trigger 14 is pulled, with the cooperation of the step 1442, the movable hook 133 is pulled into the arc-shaped bayonet 1441 by the tension spring 134 and hooks the arc-shaped bayonet to achieve the self-locking of the trigger 14, and at this point, the water gun 1 can continuously spray water without an action of keeping the trigger 14 pulled by a human hand. If it is required to stop spraying water, only by pulling the trigger 14 again and with the cooperation of the step 1442, the movable hook 133 will be pulled out of the arc-shaped bayonet 1441 by the tension spring 134, and at this point, the trigger 14 is released by the human hand, the trigger 14 is pushed by the pressure spring 18 to a non-operating state, and the water spraying is stopped.

If the user only needs to operate for a short time, the sliding member 121 can be moved to the second state, i.e., the conventional state, and at this point, the abutment post 131 abuts against the slider 122, and the movable hook 133 is located in the movement zone 143 and does not hook the trigger 14. When the trigger 14 is pulled, the water gun 1 sprays water, and when the trigger 14 is released, the water gun 1 stops spraying water.

If the user does not need to use the water gun 1, the sliding member 121 can be moved to the third state, i.e., the locking state, and at this point, the abutment post 131 abuts against the slider 122, and the movable hook 133 is located in the limiting zone 142 and abuts against the edge of the recess 141. In this state, the trigger 14 cannot be pulled, and the water gun 1 cannot spray water.

The technical features of the above embodiments may be combined arbitrarily. For the purpose of brevity of description, all the possible combinations of the technical features in the above embodiments are not described. However, as long as there is no contradiction between the combinations of these technical features, they shall all fall within the scope of the description.

The embodiments described above merely illustrate several implementations of the present application and are described relatively specifically and in detail, but should not be construed as limiting the patent scope of the present application. It should be noted that several variations and improvements may also be made by those of ordinary skill in the art without departing from the concept of the present application, and should fall within the scope of protection of the present application. Therefore, the scope of protection of the present application shall be defined by the appended claims.

What is claimed:

1. A water gun, comprising:

a housing;

an effort-saving hook assembly disposed in the housing and rotatable relative to the housing;

a trigger partially exposed from the housing and movable relative to the housing, the trigger being provided with a self-locking zone and a movement zone, the self-locking zone in which a self-locking structure is disposed; and a gear assembly, wherein the effort-saving hook assembly comprises a first end and a second end disposed opposite the first end, the first end of the effort-saving hook assembly being located in the self-locking zone, when the trigger is pulled, the first end of the effort-saving hook assembly is moved within the self-locking zone, when the trigger is released, the first end of the effort-saving hook assembly is locked with the self-locking structure to achieve self-locking of the trigger, and when the trigger is pulled and released again, the first end of the effort-saving hook assembly is unlocked from the self-locking structure, and the gear assembly is switchable between a first state and a second state under the action of an external force; when the gear assembly is switched to the first state, a movement clearance is provided between the second end and the gear assembly, and the first end of the effort-saving hook assembly is moved within the self-locking zone; when the gear assembly is switched to the second state, the second end of the effort-saving hook assembly abuts against the gear assembly and the first end of the effort-saving hook assembly is caused to be located in the movement zone, and when the trigger is either pulled or released, the first end of the effort-saving hook assembly is freely movable within the movement zone.

2. The water gun according to claim 1, wherein the trigger is further provided with a limiting zone, the gear assembly is switchable between the first state, the second state and a third state under the action of the external force, and when the gear assembly is switched to the third state, the second end of the effort-saving hook assembly abuts against the gear assembly, the first end of the effort-saving hook assembly is caused to be located in the limiting zone, and the first end of the effort-saving hook assembly abuts against the trigger to fix the trigger relative to the housing.

3. The water gun according to claim 2, wherein the gear assembly comprises a sliding member, a slider and a slide rail, the slide rail being fixed within the housing, the slider being slidably connected to the slide rail, and the sliding member being engaged with the slider and exposed from the housing, wherein a movement slot is provided in the slide rail, the second end of the effort-saving hook assembly is located in the movement slot, and under the action of the external force, the sliding member is capable of driving the slider to get close to or away from the second end of the effort-saving hook assembly, thereby achieving switching between the first state, the second state and the third state; in the first state, a movement clearance is provided between the second end of the effort-saving hook assembly and the slider, and the second end of the effort-saving hook assembly is movable in the movement slot; and in the second state and the third state, the second end of the effort-saving hook assembly abuts against the slider.

4. The water gun according to claim 3, wherein the effort-saving hook assembly comprises an abutment post, a rotating shaft, a movable hook and a tension spring, the first end of the effort-saving hook assembly being the movable hook, and the second end of the effort-saving hook assembly being the abutment post, wherein two ends of the rotating shaft are movably disposed on an inner wall of the housing to allow rotation of the rotating shaft about a central axis, the abutment post and the movable hook are disposed on a side of the rotating shaft, and the tension spring has one end connected to the movable hook, and the other end connected to the inner wall of the housing.

5. The water gun according to claim 4, wherein a recess is provided in the trigger and is divided into the limiting zone, the movement zone and the self-locking zone from top to bottom, wherein a smooth corner transition is provided between an edge of the recess in the limiting zone and an edge of the recess in the movement zone, and the edge of the recess in the limiting zone is closer to the movable hook relative to the edge of the recess in the movement zone; and in the third state, the movable hook abuts against the edge of the recess in the limiting zone.

6. The water gun according to claim 5, wherein a smooth transition is provided between an edge of the recess in the self-locking zone and the edge of the recess in the movement zone.

7. The water gun according to claim 5, wherein the self-locking structure comprises an arc-shaped bayonet and a step, the step being disposed corresponding to an opening of the arc-shaped bayonet, wherein in the first state, when the trigger is pulled, the movable hook hooks the arc-shaped bayonet under the action of the tension spring and the step, and when the trigger is released, the movable hook is locked with the arc-shaped bayonet to achieve the self-locking of the trigger; and when the trigger is pulled and released again, the movable hook is disengaged from the arc-shaped bayonet under the action of the tension spring and the step to achieve unlocking.

8. The water gun according to claim 7, wherein the step is located on a center line of the arc-shaped bayonet.

9. The water gun according to claim 1, wherein the water gun further comprises a water intake pipe, a water output pipe, a valve and a pressure spring, wherein the water intake pipe and the water output pipe are both mounted to the housing, one end of the water output pipe is connected to one side of the valve, an upper end of the water intake pipe is connected to a lower end of the valve, a lower side of one end of the trigger abuts against one end of the pressure spring, and the other end of the pressure spring is connected to an upper end of the valve;

when the trigger is pulled, the pressure spring is pressed, and the valve is driven to allow communication between the water intake pipe and the water output pipe; and when the trigger is released, the pressure spring recovers from deformation, and the valve is driven to close the water intake pipe and the water output pipe.

* * * * *